United States Patent
Yamada (10) Patent No.: US 8,036,499 B2
(45) Date of Patent: Oct. 11, 2011

(54) ACOUSTO-OPTIC FILTER

(75) Inventor: Kiyokazu Yamada, Kusatsu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 97 days.

(21) Appl. No.: 12/399,074

(22) Filed: Mar. 6, 2009

(65) Prior Publication Data

US 2009/0162002 A1  Jun. 25, 2009

Related U.S. Application Data

(63) Continuation of application No. PCT/JP2007/067483, filed on Sep. 7, 2007.

(30) Foreign Application Priority Data

Oct. 4, 2006 (JP) .................................. 2006-272629

(51) Int. Cl.
*G02F 1/335* (2006.01)
(52) U.S. Cl. .......................................................... 385/7
(58) Field of Classification Search ..................... 385/7
See application file for complete search history.

(56) References Cited

U.S. PATENT DOCUMENTS

| | | | |
|---|---|---|---|
| 5,652,809 A * | 7/1997 | Aronson | 385/7 |
| 5,677,971 A | 10/1997 | Okayama et al. | |
| 6,400,881 B1 | 6/2002 | Seino et al. | |
| 2005/0286826 A1 | 12/2005 | Tsunoda et al. | |

FOREIGN PATENT DOCUMENTS

| | | |
|---|---|---|
| JP | 05-323248 A | 12/1993 |
| JP | 08-114776 A | 5/1996 |
| JP | 11-64809 A | 3/1999 |
| JP | 2004-219589 A | 8/2004 |
| WO | 2005/003847 A1 | 1/2005 |

OTHER PUBLICATIONS

Official Communication issued in International Patent Application No. PCT/JP2007/067483, mailed on Nov. 27, 2007.
Official Communication issued in corresponding European Patent Application No. 07806924.2, mailed on Oct. 8, 2009.

* cited by examiner

*Primary Examiner* — Sarah Hahm
(74) *Attorney, Agent, or Firm* — Keating & Bennett, LLP (57) ABSTRACT

Optical waveguides are provided on a substrate, a thin film whose refractive index is optically less than the refractive indices of the optical waveguides is provided on the surface of the substrate, and a surface-acoustic-wave waveguide is arranged on the thin film so as to cross the optical waveguides in a direction oblique thereto. The optical waveguides are not directly influenced by the location of the SAW waveguide and the phase matching condition of the optical waveguides is not changed, whereby the sidelobe characteristic of an optical filter is not degraded by assigning weights to the SAW intensity.

3 Claims, 6 Drawing Sheets

ACOUSTO-OPTIC FILTER

BACKGROUND OF THE INVENTION

1. Field of the Invention

The present invention relates to an acousto-optic filter that utilizes an acousto-optic effect.

2. Description of the Related Art

Recently, data traffic has been rapidly increasing because of the proliferation of the Internet and an additional demand for greatly increasing the capacity for data traffic between in-house LANs. Because of this, optical communication that enables large-capacity communication is becoming widely used from backbone systems to access systems. An increase in optical transmission speed or multiplexing of optical wavelengths can increase the capacity of optical communication. One of the important components for achieving multiplexing of optical wavelengths is an optical wavelength filter. This is a filter that filters light of a predetermined wavelength, and is a key device for performing optical wavelength multiplex communication. In a case in which optical wavelengths are densely multiplexed, when a predetermined wavelength is filtered, it is necessary to block adjacent channels. In order to do so, a necessary filter characteristic of an optical wavelength filter must have low sidelobes with which adjacent channels can be blocked to at least a desired degree.

Acousto-optic filters configured to suppress the above-described sidelobes are described in Japanese Unexamined Patent Application Publication No. 11-64809 and Japanese Unexamined Patent Application Publication No. 8-114776.

Figure 1:
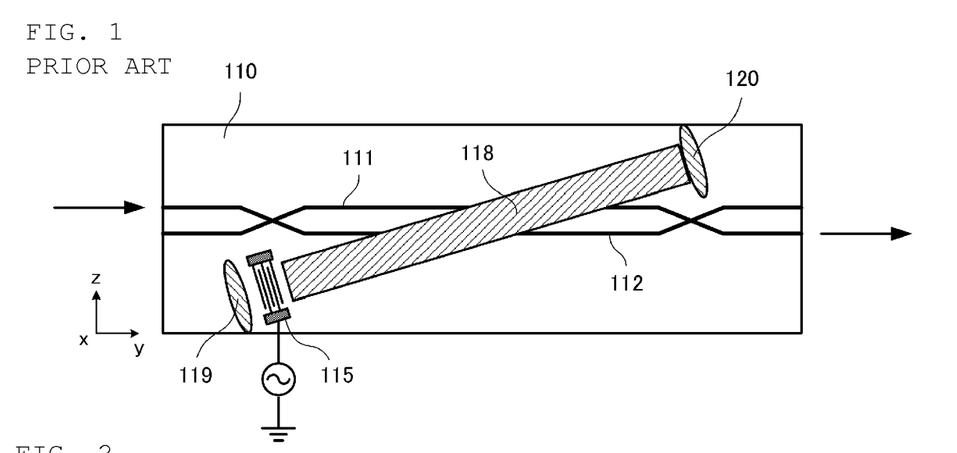
FIG. 1 is a plan view of an acousto-optic filter described in Japanese Unexamined Patent Application Publication No. 11-64809.

FIG. 1 is a plan view showing the structure of an acousto-optic filter described in Japanese Unexamined Patent Application Publication No. 11-64809. In this acousto-optic filter, optical waveguides 111 and 112 that extend in the y-axis direction on an X-cut $LiNbO_3$ substrate 110 are provided. On these optical waveguides 111 and 112, a surface acoustic wave (SAW) waveguide 118 defined by an optically transparent thin film whose refractive index is less than that of the substrate 110 is arranged such that the SAW waveguide 118 obliquely crosses the optical waveguides 111 and 112.

At one end portion of the SAW waveguide 118, a transducer 115 including comb-shaped electrodes that generate a surface acoustic wave is provided. Moreover, a SAW absorber 119 defined by a resist is provided at a location so as to sandwich the transducer 115 with the one end portion of the SAW waveguide 118. Moreover, a SAW absorber 120 defined by a resist is provided at the other end portion (a terminal) of the SAW waveguide 118.

In this manner, by arranging a SAW waveguide so as to obliquely cross the optical waveguides 111 and 112, Gaussian distribution weights are assigned in the longitudinal direction of the optical waveguides in TE-TM mode conversion regarding light that propagates in the optical waveguides 111 and 112, and thus, the sidelobes of the filter characteristics are reduced.

Figure 2:
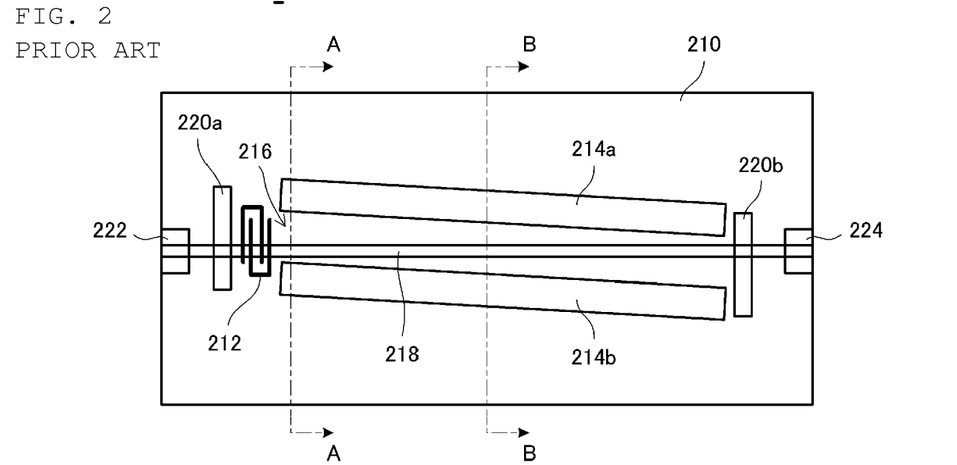
FIG. 2 is a plan view of an acousto-optic filter described in Japanese Unexamined Patent Application Publication No. 8-114776.

FIG. 2 is a plan view showing the structure of an acousto-optic filter described in Japanese Unexamined Patent Application Publication No. 8-114776. In this acousto-optic filter, a transducer 212 for exciting a surface acoustic wave is provided on an x-cut $LiNbO_3$ substrate 210. On the substrate 210, a SAW waveguide 216 which is an area divided by two parallel SAW waveguide wall units 214a and 214b is provided, and an optical waveguide 218 is provided along the SAW waveguide 216. SAW absorbers 220a and 220b are each provided at a corresponding one of the end portions of the SAW waveguide.

Moreover, this acousto-optic filter includes an incident light polarizer 222, which is coupled to the optical waveguide 218 and which treats only polarized waves in a specific direction (TE waves) as signal light. Regarding the TE waves isolated by the polarizer 222, only signal light having a specific wavelength according to the wavelength of the SAW is converted into TM waves. As a result, signal light that has been converted into the TM waves whose polarizing direction is orthogonal to the polarizing direction of the TE waves is isolated from outgoing light by an outgoing light polarizer 224.

In this manner, since the two parallel SAW waveguide wall units 214a and 214b that sandwich the optical waveguide 218, which is straight, are arranged in a direction oblique to the direction in which the optical waveguide 218 extends, TE-TM mode conversion can be performed without significantly changing coupling coefficients along the optical waveguide.

Figure 3:
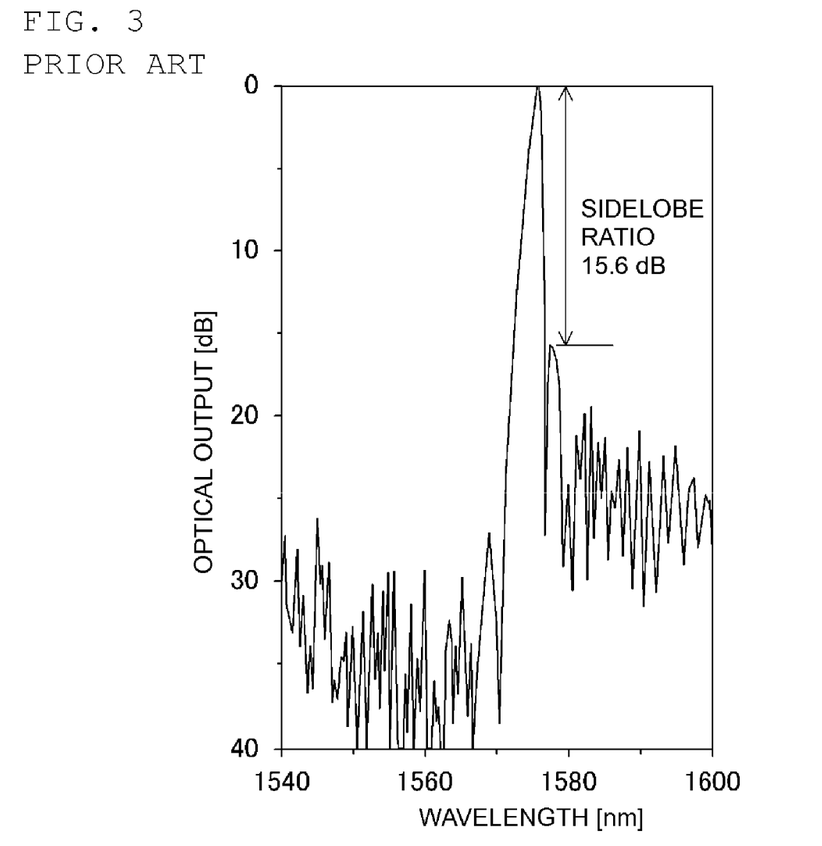
FIG. 3 is a diagram showing an example of the sidelobe characteristic of filter characteristics due to a change in a phase matching condition.

In the acousto-optic filter described in Japanese Unexamined Patent Application Publication No. 11-64809, the sidelobes of the filter characteristics can be reduced by assigning Gaussian distribution weights in the longitudinal direction of the optical waveguide in TE-TM mode conversion. However, when an apparatus was actually produced and the characteristics thereof were measured, it was discovered that a value that represents a reducing-sidelobe effect was considerably less than the theoretical value. FIG. 3 shows the characteristics. In this example, light of a wavelength of 1575 nm passes through and light of other wavelengths is blocked. The theoretical value of the maximum sidelobe ratio is −40 dB; however, the maximum sidelobe ratio is practically about −15.6 dB. Even in this case, there is a larger suppressing-sidelobe effect than in the conventional case in which the maximum sidelobe ratio is 90 dB and in which the assignment of weights to the SAW intensity is not performed. However, further suppression of the above-described sidelobes is required in order to improve the degree of optical wavelength multiplexing.

SUMMARY OF THE INVENTION

To overcome the problems described above, preferred embodiments of the present invention provide an acousto-optic filter that further reduces the sidelobes of the filter characteristics.

The inventor of the present invention discovered a problem in that an expected sidelobe-reducing effect could not be obtained, and thus, invented a unique structure and configuration that overcomes this problem. That is, an acousto-optic filter according to preferred embodiments of the present invention is designed not to be influenced by a SAW waveguide with the presumption that the optical waveguide changes its optical propagation constant because of the influence caused by the SAW waveguide.

An acoustic-optic filter according to a preferred embodiment of the present invention includes an optical waveguide and a surface-acoustic-wave waveguide that cross each other on a substrate, and the optical waveguide and the surface-acoustic-wave waveguide are spaced apart from one another at a starting portion and an ending portion of an operation area of the surface-acoustic-wave waveguide and a portion above the optical waveguide is optically constant at least within the operation area.

Preferably, the optically constant portion includes a first thin film having a refractive index that is less than that of the optical waveguide that is provided above an optical transmission line.

The surface-acoustic-wave waveguide is preferably defined by a second thin film that is arranged on the first thin film.

The surface-acoustic-wave waveguide is preferably provided in an area that is sandwiched between surface-acoustic-wave barrier units defined by third and fourth thin films disposed on the first thin film.

In a case in which a surface-acoustic-wave waveguide is directly disposed on an optical waveguide within an operation area, the propagation constant of the optical waveguide changes. However, according to preferred embodiments of the present invention, a portion disposed above an optical waveguide is optically constant regardless of the arrangement (positional relationship) of a surface-acoustic-wave waveguide within an operation area of the surface-acoustic-wave waveguide. Thus, the optical propagation constant does not change on the optical waveguide, and the phase matching condition does not change. As a result, an increased sidelobe-reducing effect is obtained by weights being assigned to the SAW intensity, whereby an acousto-optic filter having low sidelobes can be obtained.

Moreover, a portion above an optical waveguide is optically constant by providing a first thin film whose refractive index is less than that of the optical waveguide, regardless of the arrangement (positional relationship) of a surface-acoustic-wave waveguide, whereby the structure can be simplified and is easily manufactured.

Moreover, if a surface-acoustic-wave waveguide defined by a second thin film is arranged on the thin film, the structure is simplified and is easily manufactured.

Moreover, if an area sandwiched between surface-acoustic-wave barrier units defined by the third and fourth thin films is provided as a surface-acoustic-wave waveguide by arranging the surface-acoustic-wave barrier units on the first thin film, the structure is simplified and is easily manufactured.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

An acousto-optic filter according to a first preferred embodiment of the present invention will be described with reference to FIG. 4 through FIG. 7D.

Figure 4:
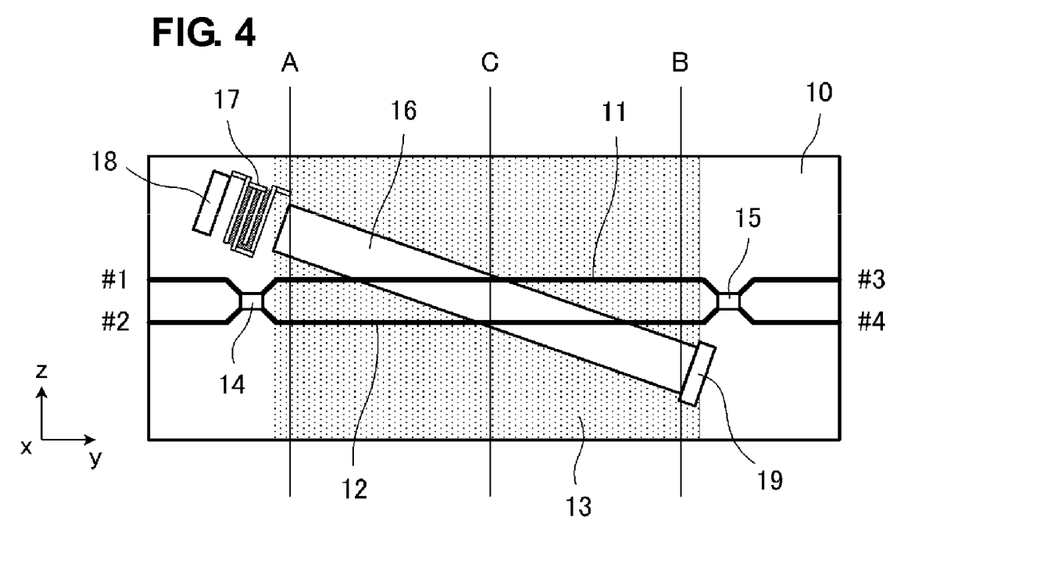
FIG. 4 is a plan view of an acousto-optic filter according to a first preferred embodiment of the present invention.
Figure 5A:
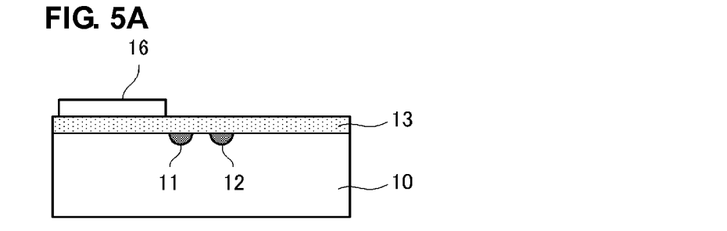
FIGS. 5A to 5C include sectional views of various portions of the acousto-optic filter.
Figure 5B:
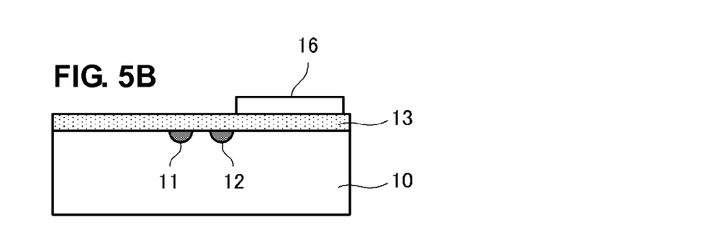
Figure 5C:
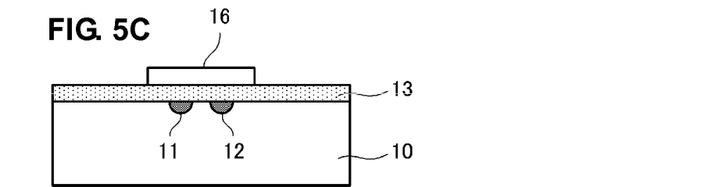

FIG. 4 is a plan view of an acousto-optic filter according to the first preferred embodiment. FIGS. 5A to 5C include sectional views at portions A, B, and C in FIG. 4.

In this acousto-optic filter, optical waveguides 11 and 12 that extend in the y-axis direction and polarizing beam splitters (PBSs) 14 and 15 are provided on a substrate 10. A thin film 13 is arranged above the optical waveguides 11 and 12. Moreover, a SAW waveguide 16 is arranged on the top surface of the thin film 13 so as to cross the optical waveguides 11 and 12 in a direction oblique thereto.

At one end portion of the SAW waveguide 16, a transducer 17 including comb-shaped electrodes that generate a surface acoustic wave is provided. Moreover, a SAW absorber 18 defined by a resist is provided at a location so as to sandwich the transducer 17 with the one end portion of the SAW waveguide 16. Moreover, a SAW absorber 19 defined by a resist is provided at the other end portion (a terminal) of the SAW waveguide 16.

Specifically, Ti-diffused optical waveguides 11 and 12 preferably having a depth of about 90 nm, for example, are provided in the x-cut y-propagation direction $LiNbO_3$ substrate 10. The optical waveguides 11 and 12 are preferably formed by performing thermal diffusion at about 1040° C. for about eight hours. The transducer 17 preferably has a wavelength $\lambda$ of about 20 μm and an aperture of about 60 μm, and is driven at frequencies from about 170 MHz to about 180 MHz, for example.

A section from A to B is an operation area, and the length of this operation area is preferably about 40 mm along the optical waveguide, for example. Moreover, the crossing angle between the optical waveguides 11 and 12 and the SAW waveguide 16 is preferably about 0.29°, for example.

Preferably, a thin film 13 made of ZnO having a thickness of about 0.3 μm and is arranged on the top surface of the substrate 10 in an area including the operation area. Preferably, the thin film 13 does not increase optical propagation loss of the optical waveguides 11 and 12 and has a relatively small SAW propagation loss. For example, $SiO_2$ or other suitable material may preferably be used instead of ZnO.

Preferably, a SAW waveguide 16 made of ZnO having a thickness of 0.3 μm is arranged on the top surface of the thin film 13. Preferably, the SAW waveguide 16 has a relatively small surface-acoustic-wave propagation loss. Alternatively, a metal film can be used other than the ZnO film.

In FIG. 4, the PBSs 14 and 15 are polarized-wave separators that cause TE-mode light to pass through in a proceeding direction and TM-mode light to pass through in a direction that crosses the proceeding direction. When light that propagates in the two optical waveguides 11 and 12 is passing through the operation area, a plane of polarization of the light rotates in accordance with the wavelength of a surface acoustic wave that propagates in the SAW waveguide 16. Thus, light that is obtained from light incident from a port #1 in accordance with the wavelength of the surface acoustic wave that propagates in the SAW waveguide emits from a port #4.

Figure 6:
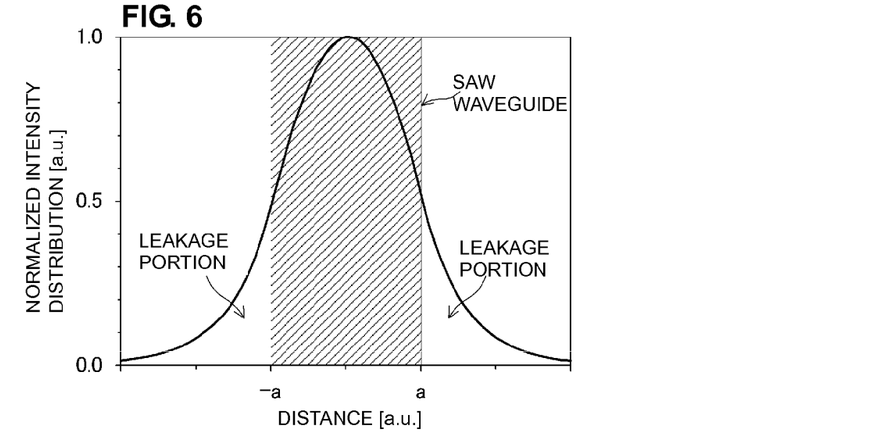
FIG. 6 is a diagram showing an exemplary intensity distribution of a SAW waveguide.
Figure 7A:
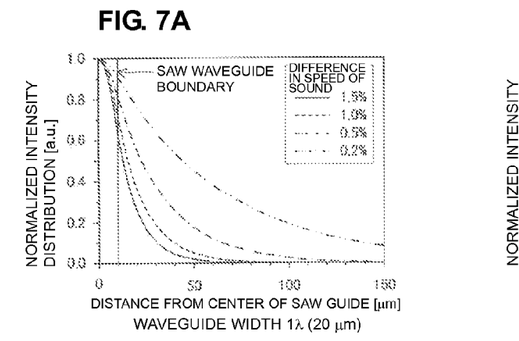
FIGS. 7A to 7D include diagrams showing exemplary intensity distributions of a SAW waveguide.
Figure 7B:
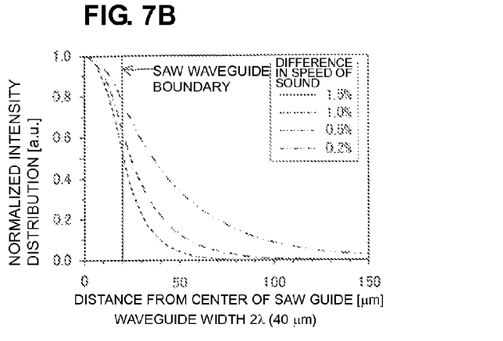
Figure 7C:
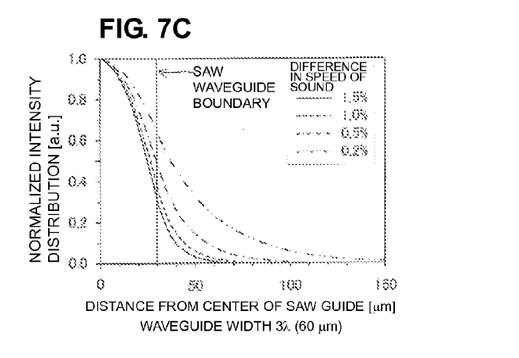
Figure 7D:
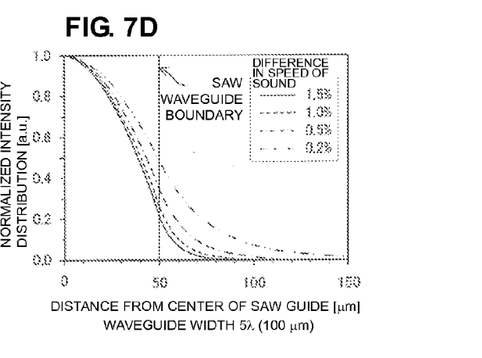

FIG. 6 shows a SAW intensity distribution of the SAW waveguide 16 shown in FIG. 5C. Here, the horizontal axis represents the distance from the middle point of the SAW waveguide in the width direction [au] and the vertical axis represents normalized intensity [au]. An example is shown in which the normalized intensity distribution is about 0.5 at the locations at which the distances from the middle point of the SAW waveguide are a and −a in the width direction. The surface acoustic wave not only propagates in the SAW waveguide portion but leakage also occurs, as shown in FIG. 6. The amount of leakage is determined in accordance with a difference in the speed of sound of a SAW between inside of and outside of the SAW waveguide or the width of the SAW waveguide as shown in FIGS. 7A to 7D. Thus, due to a surface acoustic wave propagating in the SAW waveguide, mode conversion (rotation of a plane of polarization) occurs in the light that propagates in the optical waveguide including leakage portions.

Next, a phase matching condition in the operation area will be described.

Here, if the wavelength of light is denoted by $\lambda$, propagation constants of the TE and TM modes are denoted by $\beta a$ and $\beta b$, effective refractive indices are denoted by Na and Nb, and the phase speed of a surface acoustic wave is denoted by $\Lambda$, the phase matching condition is expressed by:

$$|\beta a - \beta b| = (2\pi/\lambda)|Na - Nb| = 2\pi/\Lambda.$$

The phase constants $\beta a$ and $\beta b$ on the optical waveguide in the operation area shown in FIG. 4 are substantially constant due to the thin film 13 being provided, and thus, the above-described phase matching condition does not change and assigning of weights to the SAW intensity causes an increased sidelobe-reducing effect, whereby an acousto-optic filter having low sidelobes can be obtained.

Second Preferred Embodiment

Figure 8:
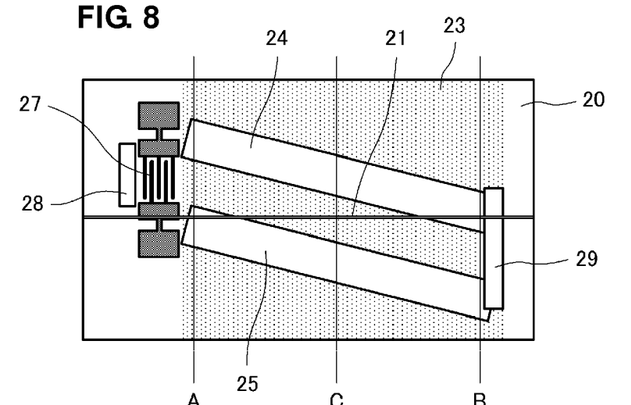
FIG. 8 is a plan view of an acousto-optic filter according to a second preferred embodiment of the present invention.
Figure 9A:
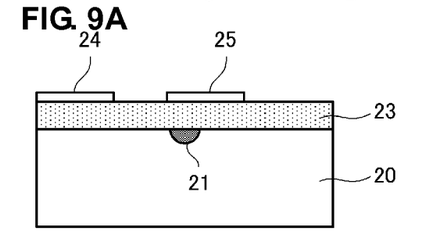
FIGS. 9A to 9C include sectional views of various portions of the acousto-optic filter.
Figure 9B:
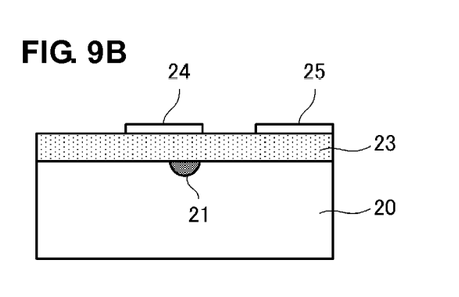
Figure 9C:
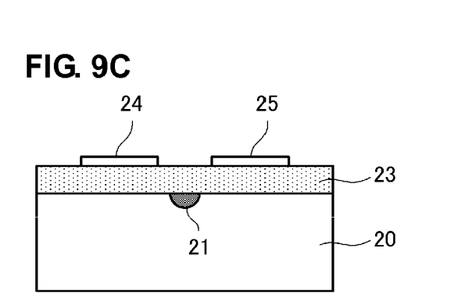

FIG. 8 is a plan view of an acousto-optic filter according to a second preferred embodiment of the present invention. FIGS. 9A to 9C include sectional views at portions A, B, and C in FIG. 8.

In this acousto-optic filter, an optical waveguide 21 that extends in the y-axis direction is provided on a substrate 20. A thin film 23 is arranged above the optical waveguide 21. Moreover, SAW waveguide wall units 24 and 25 are arranged on the top surface of the thin film 23 so as to cross the optical waveguide 21 in a direction oblique thereto.

At one end portion of the SAW waveguide sandwiched between the SAW waveguide wall units 24 and 25, a transducer 27 including comb-shaped electrodes that generate a surface acoustic wave is provided. Moreover, a SAW absorber 28 defined by a resist is arranged at a location so as to sandwich the transducer 27 with the one end portion of the SAW waveguide. Moreover, a SAW absorber 29 defined by a resist is arranged at the other end portion (a terminal) of the SAW waveguide.

Specifically, a Ti-diffused optical waveguides 11 and 12 preferably having depth of about 90 nm, for example, are provided in the x-cut y-propagation direction LiNbO$_3$ substrate 10. The optical waveguides 11 and 12 are preferably formed by performing thermal diffusion at about 1040° C. for about eight hours. The transducer 17 preferably has a wavelength $\lambda$ of about 20 μm and an aperture of about 60 μm, for example, and is driven at frequencies from about 170 MHz to about 180 MHz, for example.

In FIG. 8, a section from A to B is an operation area, and the length of this operation area is preferably about 40 mm along the optical waveguide, for example. Moreover, the crossing angle between the optical waveguide 21 and the SAW waveguide is preferably about 0.29°, for example.

Preferably, a thin film 23 of ZnO having a thickness of about 0.3 μm is provided on the top surface of the substrate 20 in a range including the operation area, for example. The thin film 23 preferably does not increase optical propagation loss of the optical waveguide 21 and has a relatively small SAW propagation loss. Alternatively, SiO$_2$ or other suitable materials may be used instead of ZnO.

Preferably, SAW waveguide wall units 24 and 25 made of SiN preferably having a thickness of about 0.3 μm, for example, are provided on the top surface of the thin film 23. The propagation speed of a surface acoustic wave must be increased due to the SAW waveguide wall units 24 and 25, and the SAW waveguide wall units 24 and 25 preferably have a relatively small surface-acoustic-wave propagation loss. Alternatively, an AlN film can be used instead of the SiN film.

In this manner, the thin film 23 is arranged above the optical waveguide 21 to produce an optically constant state (a state in which the refractive index is constant). Thus, the phase constant of the optical waveguide is substantially constant. Thus, the sidelobes according to the design of the SAW intensity distribution can be obtained.

Since the SAW waveguide wall units 24 and 25 are provided on the thin film 23 and only the thin film 23 is provided on the optical waveguide 21 as shown FIG. 9C, the SAW propagation loss can be further suppressed as compared to the first preferred embodiment of the present invention.

Third Preferred Embodiment

Figure 10A:
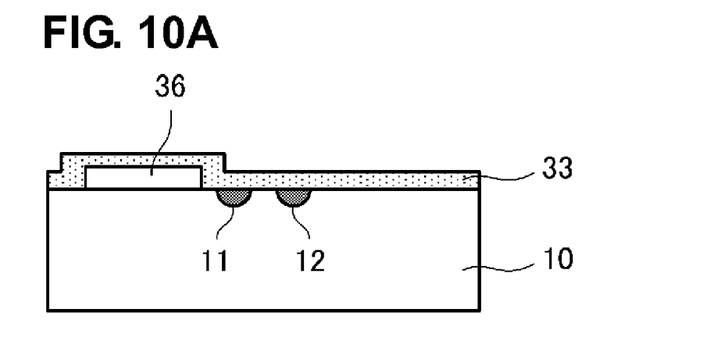
FIGS. 10A to 10C include sectional views of various portions of an acousto-optic filter according to a third preferred embodiment of the present invention.
Figure 10B:
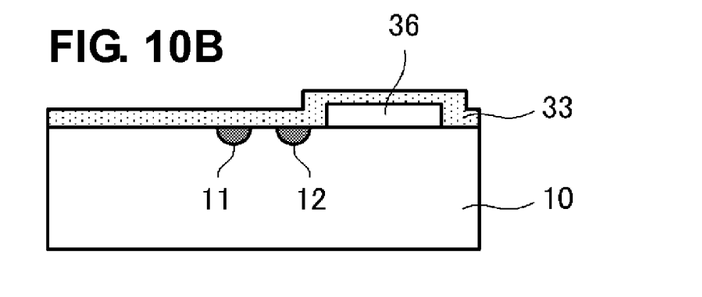
Figure 10C:
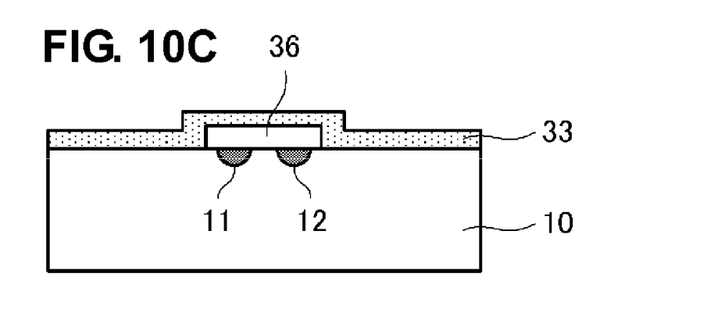

FIGS. 10A to 10C are sectional views of an acousto-optic filter according to a third preferred embodiment of the present invention. The plan view of this acousto-optic filter shows a similar configuration to that shown in FIG. 4. A SAW waveguide 36 is directly disposed on the substrate 10 and a thin film 33 is provided over the entire or substantially the entire top surface (an operation area) of the substrate 10 including the SAW waveguide 36. The thin film 33 is composed of a material having a optical refractive index that is substantially the same as that of the SAW waveguide 36.

With this configuration, the propagation constant of the optical waveguides 11 and 12 is substantially constant in any of sectional areas shown in FIGS. 10A to 10C, and an acousto-optic filter having low sidelobes can be obtained without changing the phase matching conditions and degrading the suppression of the sidelobes due to assigning of weights to the SAW intensity.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An acousto-optic filter comprising:
   a substrate;
   an optical waveguide provided on the substrate; and
   a surface-acoustic-wave waveguide arranged to cross the optical waveguide; wherein
   the optical waveguide and the surface-acoustic-wave waveguide are spaced apart from one another in a direction parallel to a plane in which the optical waveguide extends at a starting portion and an ending portion of an operation area of the surface-acoustic-wave waveguide;

a first thin film having a refractive index less than that of the optical waveguide is disposed above the optical waveguide and beneath the surface-acoustic-wave waveguide;

the first thin film extends over the entire operation area of the surface-acoustic-wave waveguide; and the surface-acoustic-wave waveguide is arranged such that a difference in the speed of sound inside of the surface-acoustic-wave waveguide and the speed of sound outside of the surface-acoustic-wave waveguide is less than or equal to about 1.5%.

2. The acousto-optic filter according to claim 1, wherein the surface-acoustic-wave waveguide includes a second thin film that is arranged on the first thin film.

3. The acousto-optic filter according to claim 1, wherein the surface-acoustic-wave waveguide is provided in an area that is sandwiched between surface-acoustic-wave barrier units defined by third and fourth thin films disposed on the first thin film.

* * * * *